B. HEYMAN.
NOZZLE FOR OXYACETYLENE AND SIMILAR TORCHES.
APPLICATION FILED NOV. 19, 1919.
1,397,519.
Patented Nov. 22, 1921.
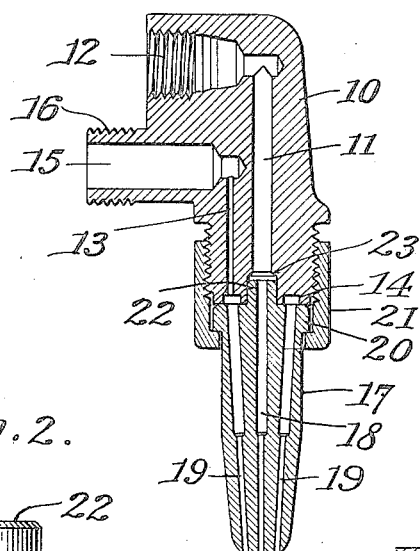
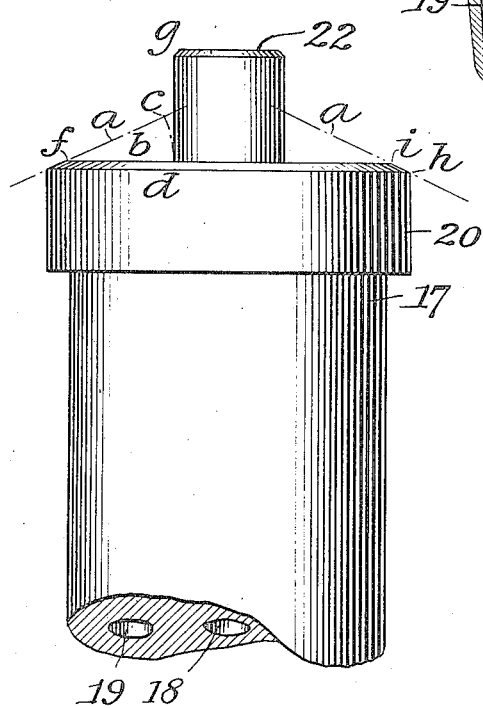
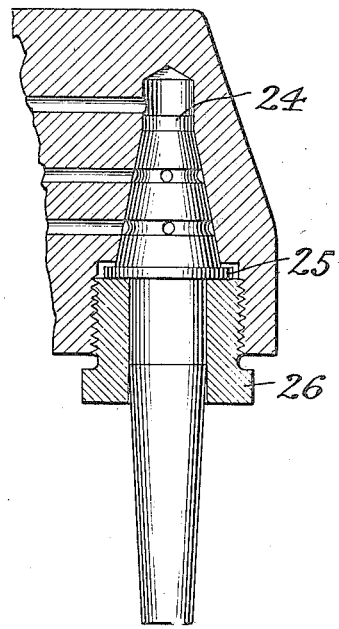

UNITED STATES PATENT OFFICE.

BENJAMIN HEYMAN, OF NEWARK, NEW JERSEY, ASSIGNOR TO OXWELD ACETYLENE COMPANY, OF NEWARK, NEW JERSEY, A CORPORATION OF WEST VIRGINIA.

NOZZLE FOR OXYACETYLENE AND SIMILAR TORCHES.

1,397,519.  Specification of Letters Patent.  Patented Nov. 22, 1921.

Application filed November 19, 1919. Serial No. 339,188.

*To all whom it may concern:*

Be it known that I, BENJAMIN HEYMAN, a citizen of the United States of America, residing at Newark, in the county of Essex and State of New Jersey, have invented certain new and useful Improvements in Nozzles for Oxyacetylene and Similar Torches, of which the following is a full, clear, and exact description.

This invention relates to torches for welding and cutting metals, and pertains more particularly to the nozzle or burner tip from which the flame or flames are projected. The chief object of the invention, briefly stated, is to provide a nozzle having a gas-tight joint with the head of the torch and which can be easily removed and replaced but which, when removed, will be practically incapable to injury at the point where it fits the head. Preferably the nozzle is not itself threaded to the head but is secured by means of a threaded collar or union which screws on the head. In the preferred embodiment the meeting faces of the nozzle and head are machined, preferably flat, that is, on a plane perpendicular to the axis of the nozzle, and the latter is provided with a circumferential rib or flange for coöperation with the union. At the center of the meeting face of the nozzle is an axial projection, preferably cylindrical in form, and the edge of said face is provided with a slight bevel, so that if the nozzle happens to fall it cannot strike upon the aforesaid meeting face and be nicked or otherwise injured to the impairment of the desired gas-tight fit with the head.

Referring to the accompanying drawing, Figure 1 is a section of the head and nozzle of a cutting torch in which the present invention is embodied in its preferred form.

Fig. 2 is a side view of the nozzle, detached from the head.

Fig. 3 is a sectional view showing the preferred mode of applying the invention to a nozzle the rear end of which is conical to fit a conical seat in the head.

Referring to Figs. 1 and 2, the head 10 has a central bore 11 communicating with a threaded socket 12 for connection with an oxygen supply pipe, and is provided with passage 13 for conveying the combustible mixture (usually oxygen and acetylene) to the annular distributing passage 14, formed by a groove cut in the outer face of the head. The passage 13 communicates with a bore 15, which terminates in a threaded nipple 16 for connection with a pipe for supplying the mixture.

The nozzle 17 is made in one piece and has a central passage 18 to register with the oxygen passage 11 of the head, and one or more passages 19 communicating with the annular distributing passage 14. At its rear end the nozzle has a circumferential flange 20 to coöperate with the union or collar 21 which screws on the head to hold the nozzle removably in position. The meeting faces of the nozzle and head are machined flat to make a gas-tight joint thereat.

At the center of its rear face the nozzle is provided with a rearward extension or stud 22, preferably cylindrical or conical in form, and to accommodate the stud when the parts are assembled the head is provided with a corresponding recess 23.

At the edge of the rear face of the nozzle is a bevel, the inclination of which depends upon the height of the stud 22, or vice versa; the height of the stud and the inclination of the bevel being such that the conical surface thereof, if extended to an apex, would intersect the stud, as indicated by the broken lines *a, a*, in Fig. 2. Or, stated otherwise, the angle *b* is such that the natural tangent of the arc *c—d*, drawn from *f* as a center with radius *f—d*, is less than the height *d—g* of the stud 22.

If now the nozzle is dropped and strikes on its rear end the blow will be received on the extreme edge *h* or on the end of the stud, or both, and not on the edge *i* or the flat meeting face. The face and its edge are thus protected from dents and nicks. Burrs resulting from such damage to the stud or to the edge *h*, if sufficient to interfere with assembly of the parts, can be removed with a file without impairing the gas-tight fit of the two faces; but any attempt to file off a burr raised on the meeting face of the nozzle is almost certain to injure the joint and permit leakage of gas thereat. In exceptional cases the edge *i* may receive a slight blow but with this edge sufficiently far from the position of the annular passage 14, Fig. 1, light filing, in the direction of flattening the bevel, will ordinarily do no harm. A chip or nick such as would be broken out of the edge *i* by any blow that the edge might receive would ordinarily be harmless, but even a small flake or chip knocked out of the flat face is apt to produce a leak.

In a torch in which the rear end of the nozzle is conical, as in Fig. 3, and makes a gas-tight fit with a conical seat in the head, the conical surface of the nozzle is protected by a stud 24 at the end and a flange 25 at the edge of the conical face, the flange serving also to coöperate with the collar 26 by which the nozzle is held in place.

It is to be understood that the invention is not limited to the specific constructions herein illustrated and described but can be embodied in other forms without departure from its spirit.

I claim:

1. A nozzle for an oxyacetylene or similar torch, having at its rear a machined surface to make a gas-tight fit with a corresponding surface in the head of the torch, and having also a central stud or projection at its rear and having at the outer edge of said machined surface means serving with the stud or projection to prevent the machined surface from receiving a blow when the nozzle is dropped.

2. A nozzle for an oxyacetylene or similar torch, having at its rear a machined surface to make a gas-tight fit with a corresponding surface in the heaed of the torch, and having also a central stud or projection at its rear and having at the outer edge of said machined surface a beveled flange serving with the stud or projection to prevent the machined surface from receiving a blow when the nozzle is dropped.

3. A nozzle for an oxyacetylene or similar torch, having at its rear a machined surface to make a gas-tight fit with a corresponding surface in the head of the torch, and having also at its rear a central stud or projection and having at the outer edge of the machined surface a relatively flat bevel serving with the stud to prevent the machined surface from receiving a blow when the nozzle is dropped.

4. A nozzle for an oxyacetylene or similar torch, having at its rear a flat machined surface to make a gas-tight fit with a corresponding surface in the head of the torch and having a central stud or projection extending from said flat surface, the latter surface having at its outer edge a relatively flat bevel, for the purpose described.

5. A nozzle for an oxyacetylene or similar torch, having at its rear a machined surface to make a gas-tight fit with a corresponding surface in the head of the torch, and having also a central stud or projection extending from said machined surface and having below said machined surface a circumferential flange joined to the said machined surface by a relatively flat conical surface, for the purpose described.

In testimony whereof I hereunto affix my signature.

BENJAMIN HEYMAN.